United States Patent [19]

Watatani et al.

[11] 3,903,356

[45] Sept. 2, 1975

[54] APPARATUS FOR REPRODUCING SYNCHRONIZING SIGNALS

[75] Inventors: Yoshizumi Watatani, Machida; Katsuo Mohri; Hiroaki Nabeyama, both of Yokohama; Masaaki Fukuda, Kodaira; Tatsuo Kayano, Hachioji; Takehiko Yoshino, Yokohama; Eiichi Sawabe, Machida; Takashi Uehara, Inagi, all of Japan

[73] Assignees: Hitachi Ltd.; Hitachi Electronics, Ltd.; Nippon Hoso Kyokai, all of Tokyo, Japan

[22] Filed: Apr. 15, 1974

[21] Appl. No.: 460,888

[30] Foreign Application Priority Data

Apr. 18, 1973 Japan .............................. 48-43182

[52] U.S. Cl.... 178/5.6; 178/DIG. 23; 178/69.5 TV; 179/15 BS

[51] Int. Cl. .............................................. H04n 5/08

[58] Field of Search ...... 178/5.6, 69.5 TV, DIG. 23; 179/15 BS, 15 BM

[56] References Cited

UNITED STATES PATENTS

| | | | |
|---|---|---|---|
| 3,730,994 | 5/1973 | Terry et al. | 178/69.5 TV |
| 3,814,855 | 6/1974 | Kokado | 178/69.5 TV |

*Primary Examiner*—Richard Murray
*Assistant Examiner*—Mitchell Saffian
*Attorney, Agent, or Firm*—Stevens, Davis, Miller & Mosher

[57] ABSTRACT

An apparatus for reproducing a plurality of synchronizing signals from a composite signal including said plurality of synchronizing signals of different repetition frequencies and phases. The composite signal includes first and second synchronizing signals which are included in video and audio signals at different repetition frequencies and are necessary for reproducing the video and audio signals arranged in accordance with a predetermined sequence. These first and second synchronizing signals are so included that these phases are identical with each other at a common division frequency of these synchronizing signal frequencies. The composite signal further includes a third synchronizing signal which is included at least in boundaries between the video and audio signals. This third synchronizing signals has a frequency which is equal to said common division repetition frequency of said first and second synchronizing signals and is included at a position where the phases of the first and second synchronizing signals are identical with each other. The apparatus for reproducing the above mentioned synchronizing signals comprises means for detecting and reproducing a predetermined one of said first and second synchronizing signals from the composite signal, means for detecting and reproducing said third synchronizing signal and means for reproducing the other of said first and second synchronizing signals with using the previously reproduced two synchronizing signals.

8 Claims, 8 Drawing Figures

APPARATUS FOR REPRODUCING SYNCHRONIZING SIGNALS

BACKGROUND OF THE INVENTION

The invention relates to a synchronizing signal reproducing apparatus which receives a composite signal having a video signal and an audio multiplexed signal transmitted with a predetermined sequence and a plurality of pulse coded synchronizing signals inserted at predetermined positions with respect to the video and audio signals and reproduces a plurality of signals each of which is synchronized with each of said plurality of synchronizing signals in said composite signal.

One preferred example of such a composite signal is a still picture broadcasting signal. Thus the apparatus for reproducing synchronizing signals according to the invention is particularly suitable for use in a receiver for the still picture broadcasting signal.

A still picture broadcasting system of the kind mentioned above has been described in, for example a specification of a U.S. patent application Ser. No. 361,581 which was filed on May 8, 1973. This system will be explained briefly hereinafter.

In this still picture broadcasting system the video and audio signals are transmitted in turns in accordance with a predetermined sequence. In one embodiment a video signal of a period of 1/30 seconds and an audio signal of a period of 1/15 seconds are transmitted alternately. The video signal in the video signal transmission period is transmitted at a horizontal scanning period $1/f_H(\approx 63.5\mu)$ like as a standard television signal. This video signal of 1/30 seconds can constitute a still picture and thus different still pictures may be transmitted in different video signal transmission periods. In the audio signal transmitting period the audio signal is sampled at a repetition period $1/f_A$ which is different from the above horizontal scanning period $1/f_H$ of the video signal and is pulse code modulated and further a plurality of audio signals are multiplexed in a time division mode and are transmitted at said sampling period $1/f_A$. Thus synchronizing signals necessary for reproducing the video and audio signals are transmitted at the period of $1/f_H$ during the video signal transmission period and at the period of $1/f_A$ during the audio signal transmission period. In addition to said two synchronizing signals several synchronizing signals of different repetition frequencies than those of said synchronizing signals are needed and all of these synchronizing signals are formed by pulse coded signals. That is, these synchronizing signals comprises a blanking signal, a PCM frame pattern signal (which is referred as PEP signal hereinafter) for detecting positions of the synchronizing signals and composed of a predetermined pattern formed by pulses having the same bit timing as that of the modulated pulse series of the audio multiplexed signal, and a mode control code signal (hereinafter referred as MCC signal) composed of a horizontal synchronizing signal, an audio PCM frame scynchronizing signal, a frame synchronizing signal, etc.

In the above mentioned still picture broadcasting signal the repetition period $1/f_H$ of the synchronizing signal transmitted in the video signal transmission period and the repetition period $1/f_A$ of the synchronizing signal transmitted in the audio signal transmission period are so chosen that they have a simple integer ratio. Moreover the bit period $t_b$ of the pulse series composing the PFP signal and of the modulated pulse series of the audio multiplexed signal is also so determined that it has an integer ratio with respect to $1/f_H$ and $1/f_A$.

In order to receive the still picture broadcasting signal, display a selected picture on an image display apparatus and reproduce a sound related to said selected picture, it is necessary to detect the pulse coded synchronizing signals consisting of the PFP and MCC signals and to regenerate signals synchronized with the periods of the detected signals. The synchronizing signals composed of the PFP and MCC signals are inserted in the video and audio signals with a level which is substantially same as the peak level of the video and audio signals. Therefore the above synchronizing signals could not be detected by, for example an amplitude separation method with using a slice circuit which has been generally utilized for separating the synchronizing signals from the standard television signal. As the result a synchronizing signal reproducing apparatus having a special synchronizing signal detecting circuit has to be designed. Further in order to detect and reproduce a plurality of synchronizing signals it is necessary to provide a plurality of synchronizing signal detecting and reproducing circuits the number of which is equal to that of said plurality of different synchronizing signals.

SUMMARY OF THE INVENTION

It is an object of the invention to provide a novel and effective synchronizing signal reproducing apparatus which is particularly suitable for use in the receiver of the still picture broadcasting signal.

It is another object of the invention to provide a synchronizing signal reproducing apparatus which is novel and simple in construction.

It is further object of the invention to provide a synchronizing signal reproducing apparatus which can reproduce accurately a number of synchronizing signals transmitted at different repetition periods.

It is still further object of the invention to provide a synchronizing signal reproducing apparatus which detects only a part of a number of synchronizing signals transmitted at different repetition periods and can reproduce accurately the remaining synchronizing signals without detecting them.

It is still another object of the invention to provide a synchronizing signal reproducing apparatus which can accurately detect and reproduce the synchronizing signals from the composite signal of pulse coded synchronizing signals having an amplitude which does not substantially differ from that of information signal such as video and audio signals.

According to one aspect of the invention a synchronizing signal reproducing apparatus which receives a composite signal having a video signal and an audio multiplexed signal transmitted with a predetermined sequence, first and second synchronizing signals inserted with different repetition frequencies in said video and audio signals for reproducing these video and audio signals and previously coded with pulse synchronized with the modulated pulse series of the audio multiplexed signal, and a third pulse coded synchronizing signal inserted in at least boundaries between said video and audio signals with a repetition frequency which is a common division with respect to those of said first and second synchronizing signals and locked in phase with both of said first and second synchronizing signals and reproduces all of the above synchronizing signals comprises means for detecting either one of said first and second synchronizing signals and for reproducing a synchronizing signal in phase with the detected synchronizing signal, means for detecting said third synchronizing signal and for reproducing a synchronizing signal synchronized with the detected third synchronizing signal and means for reproducing the other of said first and second synchronizing signals with using the previously reproduced two synchronizing signals.

DESCRIPTION OF THE PREFERRED EMBODIMENTS

Figure 1:
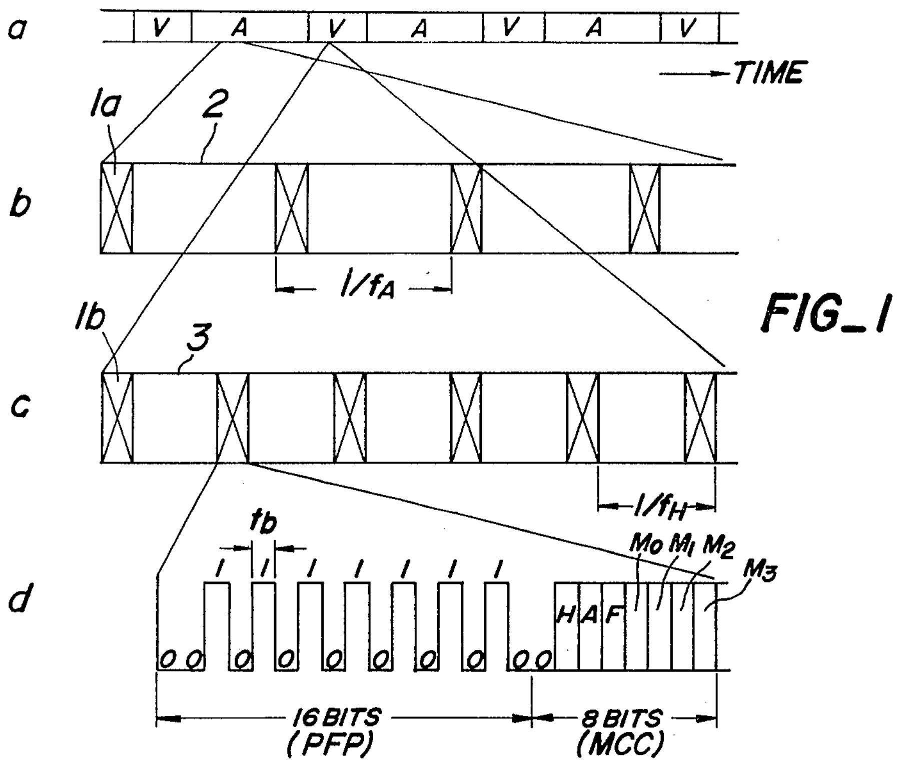
FIG. 1 shows signal waveforms of one example of a still picture broadcasting signal.

Before the embodiments of the synchronizing signal reproducing apparatus according to the invention will be explained in detail, an example of a still picture broadcasting signal will be explained with reference to the drawing. Such a still picture broadcasting signal is preferable to be received by a receiver comprising the synchronizing signal reproducing apparatus according to the invention.

FIGS. 1*a* to 1*d* are waveforms showing a detailed composition of the still picture broadcasting signal.

FIG. 1*a* illustrates the still picture broadcasting signal in which video and audio signals are transmitted alternately in a time division mode. A portion denoted by V is a video signal transmission period and a portion illustrated by A is an audio signal transmission period. The video signal transmission period V corresponds to one television frame of an ordinary television signal, that is 1/30 seconds. The audio signal transmission period A has a time period twice the period V. FIG. 1*b* shows a part of the audio signal transmission period A with the time axis being prolonged. A reference numeral 1a is a synchronizing signal and 2 is a pulse code modulated (PCM) audio multiplexed signal. FIG. 1*c* depicts a part of the video signal transmission period V with the time axis being also extended. In FIG. 1*c* a reference numeral 1*b* shows a synchronizing signal having the same construction as the synchronizing signal 1*a* and 3 is the video signal. FIG. 1*d* illustrates the synchronizing signal 1*a* or 1*b* with the time axis being further extended. In the synchronizing signal 1*a* or 1*b* there are included a PCM frame pattern signal synchronized with a pulse series modulated by the audio signal and a mode control code signal indicating that the position at which the synchronizing signal 1*a* or 1*b* is inserted coincides with a repetition period of which synchronizing signal. The PCM frame pattern signal (hereinafter referred as PFP signal) is composed of a pulse pattern having sixteen bits (bit period of which corresponds to $t_b$) of 001010 . . . 10 and this pulse pattern is always maintained unchanged. Subsequent to PFP signal, there is transmitted the mode control code signal (hereinafter referred as MCC signal) composed of eight bits. This MCC signal indicates that the repetition period at which the synchronizing signal 1*a* or 1*b* is inserted belongs either to the horizontal synchronizing signal or to the audio PCM frame synchronizing signal and that the period in which the synchronizing signal 1*a* or 1*b* is inserted belongs either to the video signal transmission period or to the audio signal transmission period. For example if the MCC signal is synchronized with the horizontal synchronizing signal, a pulse H shown in FIG. 1*d* is 1 and further if the related period is the video signal period, a pulse $M_3$ is 1 and the remaining pulse A, F, $M_0$, $M_1$ and $M_2$ are all 0. If the synchronizing signal is synchronized with the audio PCM frame synchronizing signal, the pulse A is 1, whilst the synchronizing signal is synchronized with the TV frame synchronizing signal, the pulse F is 1. That is to say various repetition periods and the transmitted siganls are identified by a combination of 1 and 0 of the pulses H, A, F, $M_0$, $M_1$, $M_2$ and $M_3$. The peak value of these PFP and MCC signals is equal to that of the video and audio signals.

In the video signal transmission period V the video signal similar to the conventional television signal is transmitted at the horizontal period $1/f_H(=63.5\mu)$ and in the audio signal transmission period the audio signal is transmitted in the form of multi-level PCM signal at the period of $1/f_A$. Thus in the video signal transmission period V the synchronizing signal 1*b* is transmitted at the period $1/f_H$ and in the audio signal transmission period the synchronizing signal 1*a* is transmitted at the period $1/f_A$. These $1/f_H$ and $1/f_A$ are predetermined to have a simple integer ratio and in the example shown in FIG. 1 these periods are selected to a ratio of 2 to 3. Further the synchronizing gsignals 1*a* and 1*b* inserted in the audio and video signal transmission periods, respectively are so transmitted that at the repetition frequency of the largest common division of these repetition frequencies $f_H$ and $f_A$ the phases of these signals coincide with each other. Moreover the repetition period $t_b$ of the bit synchronizing signal of the modulated pulse series of the audio PCM signal is so selected that it has an integer ratio with respect to $1/f_H$ and $1/f_A$.

In order to reproduce the video and audio signals from the transmitted still picture broadcasting signal it is necessary to detect the above mentioned various synchronizing signals and to regenerate synchronizing signals each of which is synchronized with each of the detected synchronizing signals.

According to the present invention all of the synchronizing signals can be reproduced not by detecting all of them, but by detecting a part thereof.

Figure 2:
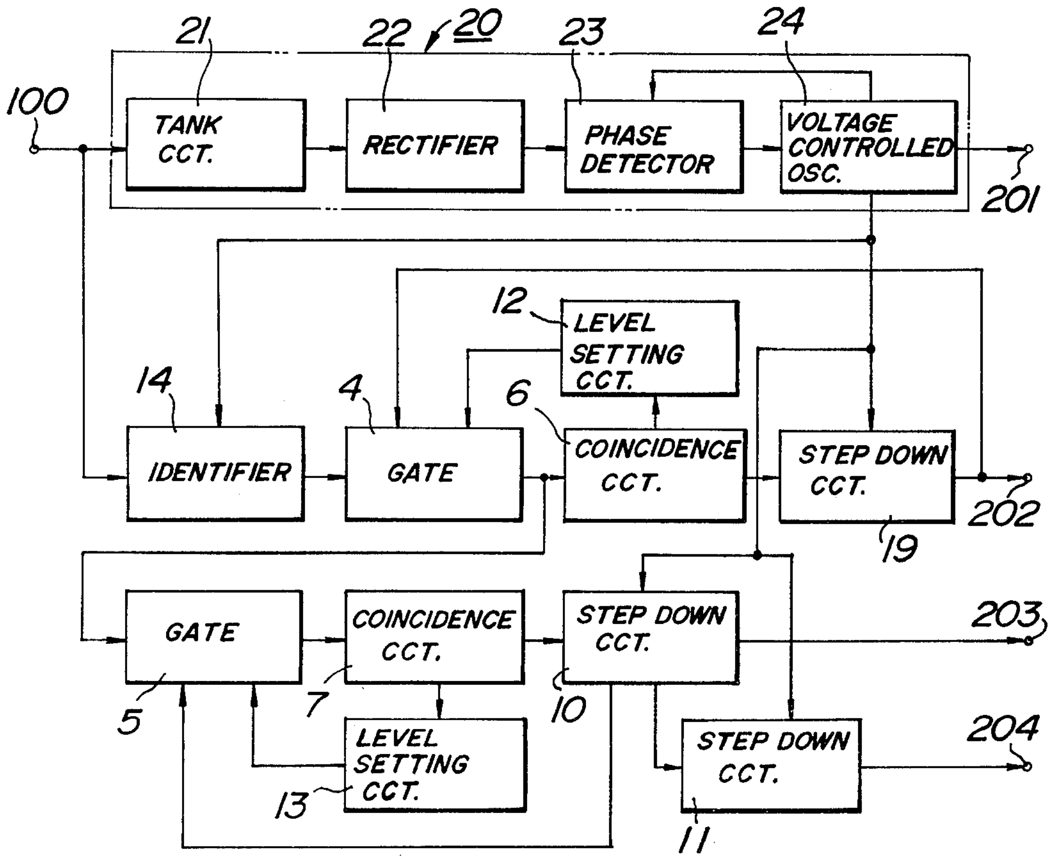
FIG. 2 is a block diagram illustrating an embodiment of the synchronizing signal reproducing apparatus according to the invention.
Figure 3:
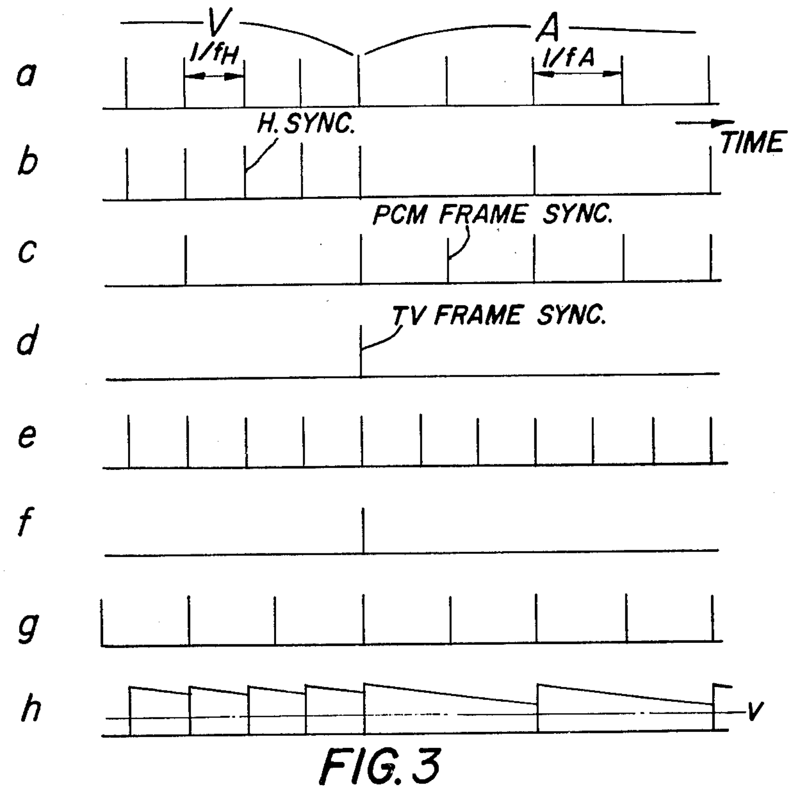
FIGS. 3 and 4 are time charts for explaining an operation of the apparatus shown in FIG. 2.
Figure 4:
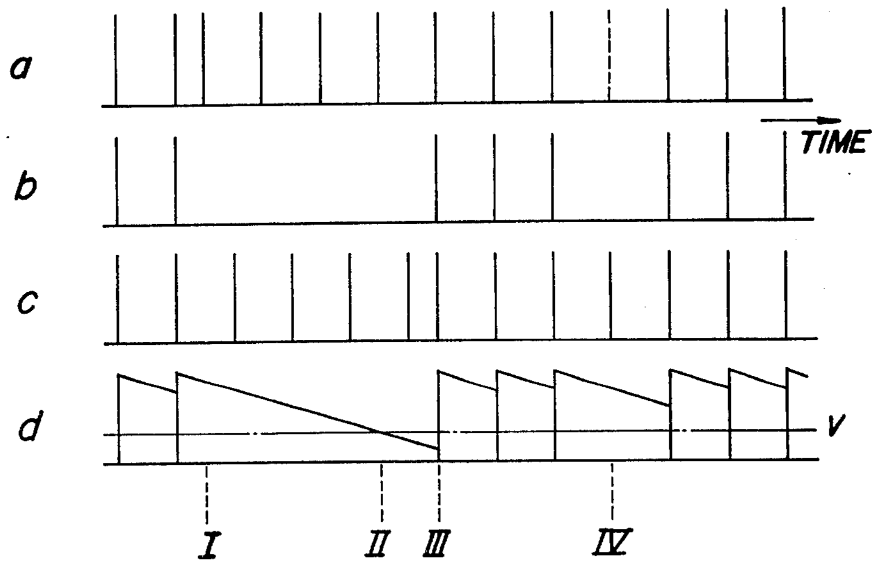

Now an embodiment of the present inention will be explained in detail. FIG. 2 is a block diagram showing an embodiment of the synchronizing signal reproducing apparatus according to the invention and FIGS. 3 and 4 are timing charts explaining the operation of the apparatus shown in FIG. 2. In the present embodiment only be detecting the horizontal synchronizing signal and the TV frame synchronizing signal it is possible to reproduce the audio PCM frame synchronizing signal as well as the horizontal synchronizing signal and the TV frame synchronizing signal.

The still picture broadcasting signal applied to an input terminal 100 is fed to a bit synchronizing signal reproducing circuit 20 and to an identifier 14. Since as shown in FIG. 1*d* the repetition period $t_b$ of the bit synchronizing signal corresponds to a pulse width of a single pulse of the PFP signal, the repetition frequency $f_b$ is twice of the fundamental frequency of the pulse series of the PFP signal. The bit synchronizing signal reproducing circuit 20 comprises a tank circuit 21 which resonates at a half frequency of the bit frequency $f_b$, a rectifier 22 which introduces a frequency component twice the fundamental frequency, a phase detector 23 and a voltage controlled oscillator 24. The reproduced bit synchronizing signal from the oscillator 24 is supplied via an output terminal 201 to, for example an audio signal reproducing circuit (not shown). The reproduced bit synchronizing signal is also supplied to the identifier 14 as a timing pulse so as to identify the still picture broadcasting signal. This identifier 14 is a circuit which is commonly used in a device dealing the digital signal transmission and is to remove a distortion of waveforms of the input signal in the transmission system. Considering the synchronizing signal included in the input signal at the input terminal 100, two synchronizing signals of different repetition periods are transmitted in the time division mode and the TV frame synchronizing signal is transmitted in the boundary between the video and audio signal transmission periods. The synchronizing signals near the boundary between the video and audio transmission periods is depicted in FIG. 3*a*. The left hand portion corresponds to the video signal transmission period in which the synchronizing signal is inserted at the horizontal synchronizing period $1/f_H$. The right hand portion corresponds to the audio signal transmission period and during this period the synchronizing signal is inserted at the repetition period $1/f_A$ of the audio PCM frame synchronizing signal. In the drawing the synchronizing signals are represented by lines for the sake of simplicity. FIG. 3*b* shows positions at which the horizontal synchronizing signal is inserted, FIG. 3*c* illustrates positions of the audio PCM frame synchronizing signal and FIG. 3*d* depicts positions of the TV frame synchronizing signal. In FIG. 3*b* the horizontal synchronizing signal is existent also in the audio signal transmission period, which is due to the fact that the horizontal synchronizing signal and the audio PCM frame synchronizing signal have the identified phase at the largest common division frequency of these signals and the audio PCM frame synchronizing signal having the identified phase has the same functions as the horizontal synchronizing signal. Furthere in FIG. 3*c* the audio PCM frame synchronizing signal is existent also in the video signal transmission period owing to the same reason. The TV frame synchronizing signal shown in FIG. 3*d* coincides with the horizontal synchronizing signal and the audio PCM frame synchronizing signal and its repetition period is 1/30 seconds. Further the TV frame synchronizing signal also coincides with the boundary between the video and audio signal transmission periods. The waveform of the synchronizing signals shown in FIG. 3 corresponds to a code in which the above three synchronizing signals in the MCC signal shown in FIG. 1d are all existent, that is the pulses H, A and F are all 1.

Figure 5:
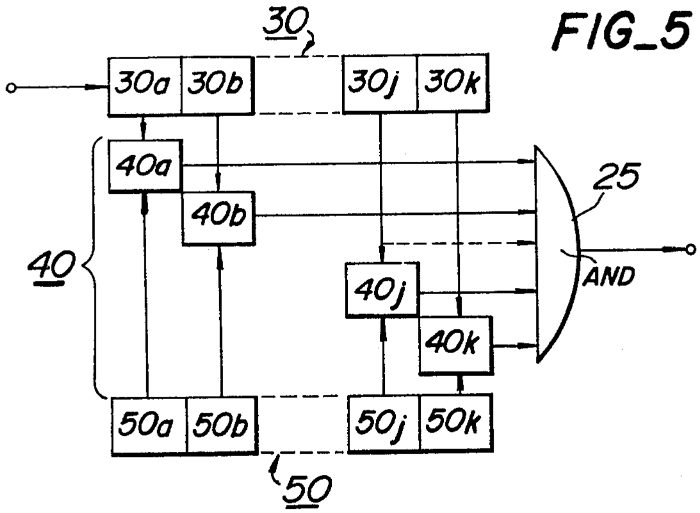
FIGS. 5 and 6 are block diagrams showing two embodiments of a coincidence circuit provided in the apparatus according to the invention.

The input signal including the synchronizing signals shown in FIG. 3*a* is supplied through a gate circuit 4 to a coincidence circuit 6. The coincidence circuit 6 is so constructed that it produces a coincidence pulse only when the input synchronizing signal includes the horizontal synchronizing signal. To this end the coincidence circuit 6 compares pulse patterns formed by a given number of bit pulses of the input signal with a predetermined pulse pattern and produces an output pulse when both patterns coincide with each otehr. An embodiment of the coincidence circit 6 is shown in FIG. 5. In FIG. 5 the input signal is supplied to a shift register 30 and the pulse pattern of the input signal is compared bit by bit in a comparator 40 with the perdetermined pulse pattern produced by a fixed pulse pattern generator 50. The comparator 40 compares a signal level 1 or 0 of the input signal stored in each stage of the shift register 30 with 1 or 0 of the pulse pattern set by the fixed pulse pattern generator 50 and when both signal levels coincide with each other, the comparator 40 produces a pulse. All outputs from the comparator are supplied to and AND circuit 25 and thus only when all pulse signals stored in the shift register 30 coincide with the corresponding pulse signals of the fixed pulse pattern, a coincidence pulse is produced at the output of the AND circuit 25. To the shift register 30 the input signal is supplied bit by bit at the timing of the bit synchronizing signal and the input signal thus supplied is transferred bit by bit to successive stages 30*a* to 30*k*, so that the fixed pulse pattern generator 50 needs no to produce pulses amplitudes of which vary with time, i.e. "pulse signal." That is to say the fixed pulse pattern generator 50 may be composed of a number of D.C. voltage generators the number and level of which are previously determined in accordance with 1 and 0 of the pulse pattern to be detected from the input signal. For example in case of detecting the PFP signal the shift register 30 is consisted of 16 stages 30*a* to 30*k*. Then the fixed pulse pattern generator 50 may be consisted of 16 D.C. voltage sources 50*a* to 50*k*, the voltage levels of which can be previously set. Output voltages of the voltage sources 50*k* and 50*j* corresponding to the last stage 50*k* and the second stage 30*j* from the last are set to a low level or earth potential in accordance with 0 of the first and second bits of the PFP signal. The output of the voltage source corresponding to the third stage from the last is set to a high voltage level in accordance with 1 of the third bit of the PFP signal. The output voltage of the next voltage source is set to the low voltage level corresponding to 0 of the fourth bit of the PFP signal. The remaining voltage sources are set to produce alterenately the high and low level voltages. In this manner 16 voltages corresponding to 001010 . . . 10 of the PFP signal are obtained. The output voltages of these voltage sources are compared with corresponding outputs of the stages 30*a* to 30*k* of the shift register 30 in bit comparators 40*a* to 40*k*, respectively. Since the output voltage of the voltage source 50*a* is set to the low voltage level, when 0 signal is applied to the first stage 30*a* of the shift register 30, the bit comparator 40*a* produces an output pulse. The input signal is sequentially supplied to the shift register 30 at the bit timing and is shifted to the subsequent stages bit by bit, so that when the whole PFP signal enters in the shift register 30, all bit comparators 40*a* to 40*k* produce pulses simultaneously. Since the outputs of the bit comparators 40*a* to 40*k* are all supplied to the AND circuit 25, only when all bit comparators produce output pulses simultaneously, the coincidence pulse appears at the output of the AND circuit 25. That is to say all of 16 bits of the PFP signal are supplied to the shift register 30, there is obtained a coincidence pulse.

In order to produce the coincidence pulse at a position of the horizontal synchronizing signal, it is necessary to constitute the fixed pulse pattern by adding a part of the MCC signal to the PFP signal. For instance the number of stages of the shift register 30 is increased by two bits and the number of the D.C. voltage sources and the bit comparators is also increased by two. Output voltages of two sources corresponding to first two stages of the shift register are set to 1 and 0, respectively and the fixed pulse pattern is changed to 001010 . . . 1001. Alternatively the PFP signal may be changed to 16 bits of 1010 . . . 1001 by deleting the first two bits. In such a case it is not necessary to increase the number of bits of the fixed pulse pattern to 18 bits.

The coincidence pulse representing the horizontal synchronizing signal thus obtained is supplied to a step down circuit 9 as shown in FIG. 2. The step down circuit 9 may be composed of a counter which counts down the bit synchronizing signal obtained from the oscillator 24 of the bit synchronizing signal reproducing circuit 20 to produce a signal having a frequently $f_H$. Therefore when the step down circuit 9 is forcedly reset by the coincidence pulse, its counted down output signal has a phase synchronized with the horizontal sychronizing signal, because the phase of reset timing coincides with that of the coincidence pulse. In this manner the signal shown in FIG. 3*e* can be obtained.

The pulse output having the frequency $f_H$ obtained by the above mentioned means is supplied to the gate circuit 4 to gate out the input signal. According to such a procedure the input synchronizing signal can be obtained with excellent S/N and a stable horizontal synchronizing signal can be obtained. As is apparent from FIGS. 3*a* and 3*e*, in the audio signal transmission period A the PFP signal is not included in the signal gated out by the gate circuit 4 at a rate of 3 to 2. Thus in the coincidence circuit 6 the coincidence pulse is produced only at a rate of 3 to 1 of the horizontal synchronizing signal. But the frequency of the signal counted down by the step down circuit 9 is accurate, because the frequency of the bit synchronizing signal derived from the bit synchronizing signal reproducing circuit 20 is accurate. Therefore the accurate horizontal synchronizing signal can be reproduced even if the coincidence pulse is not applied every time.

Next an operation of a gate threshold level setting circuit 12 will be explained. This circuit 12 is to effect a peak detection of the coincidence pulse produced by the coincidence circuit 6 and to form a signal having a waveform shown in FIG. 3*h*. This is effected by selecting a time constant of a detecting circuit provided in the circuit 12 in such a manner that a detected output is kept larger than a predetermined threshold value v as long as a new pulse is applied within a predetermined time interval. The gate circuit 4 is so constructed that when the signal shown in FIG. 3*h* is larger than the threshold level *v*, the input signal can be gated out by means of a separately supplied gate pulse, on the other hand when the signal of FIG. 3*h* is smaller than the threshold level *v*, the gating action is released and the input signal is directly supplied to the coincidence circuit 6.

FIG. 4 illustrates waveforms at various portions of the apparatus shown in FIG. 2 in a case that due to any cause the reset timing at the step down circuit 9 is erroneous so as to deviate from the coincidence pulse phase. FIG. 4*a* shows the input signal, FIG. 4*b* an output pulse from the coincidence circuit 6, FIG. 4*c* an output from the step down circuit 9 and FIG. 4*d* depicts a waveform of a detected output of the coincidence pulse at the gate threshold level setting circuit 12. Now it is assumed that the phase of the input synchronizing signal changes as shown in FIG. 4*a* at an instance I in the interval of the repetition frequency $f_H$ in the video signal transmission period. At this time since the detected output of the gate threshold level setting circuit 12 is still larger than *v* as illustrated in FIG. 4*d* the gate circuit 4 still effects the gating operation in synchronism with the output signal from the step down circuit 9. Therefore the output from the gate circuit 4 does not include the synchronizing signal. As the result thereof a coincidence pulse does not appear at the output of the coincidence circuit 6. Then the output voltage from the threshold level setting circuit 12 gradually decreases as shown in FIG. 4*d* and at last it becomes lower than the threshold value *v* at a time instance II. Then the gate circuit 4 becomes a released condition and the input signal is directly applied to the coincidence circuit 6. Thus the coincidence circuit 6 can immediately detect the horizontal synchronizing signal to produce a coincidence pulse. This coincidence pulse is applied to the step down circuit 9 so as to cause instantaneously the phase of the output signal to be coincided with that of the input synchronizing signal. At the same time the output voltage of the gate threshold level setting circuit 12 becomes larger than the threshold level *v* immediately by means of the pulse applied to the circuit 12. Thus the gate circuit 4 restarts its gating operation. At this time the frequency of the gate pulse coincides completely with the frequency of the input synchronizing signal and thus only the correct synchronizing signal can be derived from a time instance III. Therefore by effecting the gating operation in the manner mentioned above, it is possible to carry out the synchronous detection of the coincidence pulse.

In the above explanation the case in which the phase of the input synchronizing signal deviates has been explained and even if the phase of the output signal from the step down circuit 9 deviates owing to any reason, the similar operation will cause the phase to be returned to a correct one.

If the entirely same pattern as the MCC signal representing the PFP and horizontal synchronizing signals is existent accidentally in a portion other than the synchronizing signal during the conductive condition of the gate circuit 4, the coincidence circuit 6 will produce an erroneous coincidence pulse. Therefore the phase of the output signal from the step down circuit 9 will be temporally pulled into an erroneous condition by means of the erroneous coincidence pulse, but the reproduced synchronizing signal of the correct phase will be soon obtained by the operation of the gate threshold level setting circuit 12 and the gate circuit 4. That is to say when a coincidence pulse is produced by erroneous information, by means of this coincidence pulse the phase of the output signal from the step down circuit 9 is instantaneously synchronized with that of the coincidence pulse and at the same time the output of the gate threshold level setting circuit 12 becomes larger than the threshold level v and thus the gate circuit 4 gates out the input signal in synchronish with the output signal from the step down circuit 9. Thus a coincidence pulse is never produced so long as the above mentioned erroneous information is not applied in coincidence with the repetition period of the horizontal synchronizing signal. However the casually happened pulse pattern of the same pulse pattern as that of the synchronizing signal does not have a regular periodicity at positions other than the synchronizing signal. Therefore after the erroneous coincidence pulse is once produced, any coincidence pulse including a correct one does not appear for certain time period. Thus the output voltage of the gate threshold level setting circuit 12 decreases and becomes lower than the predetermined value *v*. As the result thereof the gate circuit is made conductive and the correct synchronizing signal is supplied to the coincidence circuit 6, so that the correct coincidence pulse is produced. Therefore the correct synchronizing signal is produced from the step down circuit 9.

An instance IV illustrates a case in which at least one bit of the PFP signal is erroneous owing to the fact that the input signal is subjected to noise. In this case a coincidence pulse is not produced, but the output voltage (FIg. 4*d* ) from the threshold level setting circuit 12 does not immediately decrease below the threshold level *v*. Therefore a next following horizontal synchronizing signal is gated out by the gate circuit 4 and is detected by the coincidence circuit 6 so as to produce a coincidence pulse. In this manner the normal operation is kept.

Next the TV frame synchronizing signal is reproduced in a similar manner to the detection of the above mentioned horizontal synchronizing signal. In this case such a fact is utilized that the TV frame synchronizing signal is always paired with the horizontal synchronizing signal as shown in FIGS. 3*b* and 3*d*. The synchronizing signal gated out by the gate circuit 4 is further supplied to a gate circuit 5. Through this gate circuit 5 the gated synchronizing signal is supplied to a coincidence circuit 7 so as to improve S/N of the input signal. The coincidence circuit 7 has a similar construction as the coincidence circuit 6 and a fixed pulse pattern may be set to the pattern of the TV frame synchronizing signal. By means of a coincidence pulse of the TV frame synchronizing siganl thus obtained a step down counter 10 is reset so as to reproduce the TV frame synchronizing signal. The operations of the gate circuit 5, the coincidence circuit 7, the step down circuit 10 and a gate threshold level setting circuit 13 are similar to those of the gate circuit 4, the coincidence circuit 6, the step down circuit 9 and the gate threshold level setting circuit 12 except that the frequency of the signal to be reproduced is different from that of the horizontal synchronizing signal.

Next a reproduction of the audio PCM frame synchronizing signal will be explained. This is effected by utilizing a fact that the poistion of the TV frame synchronizing signal coincides with that of the audio PCM frame synchronizing signal. That is to say the output signal from the bit synchronizing signal reproducing circuit 20 is counted down by a step down circuit 11 to a signal having the frequency of the audio PCM frame synchronizing signal and this signal is synchronized with the repetition period (1/30 seconds) of the TV frame synchronizing signal instead of the repetition period of the audio PCM frame synchronizing signal. In this manner the audio PCM frame synchronizing signal can be reproduced. In this case the synchronization is not necessary to be obtained by using all of the input synchronizing signals, but if the step down circuit 11 is consisted of a counter and a frequency of an original signal to be counted down is stable, an accurate synchronizing signal can be reproduced without doubt in the similar manner to the previously explained reproduction of the horizontal synchronizing signal.

As described above by providing only two coincidence circuits for detecting the horizontal synchronizing signal and the TV frame synchronizing signal, respectively, the audio PCM frame synchronizing signal as well as the above two synchronizing signals can be reproduced accurately.

Figure 6:
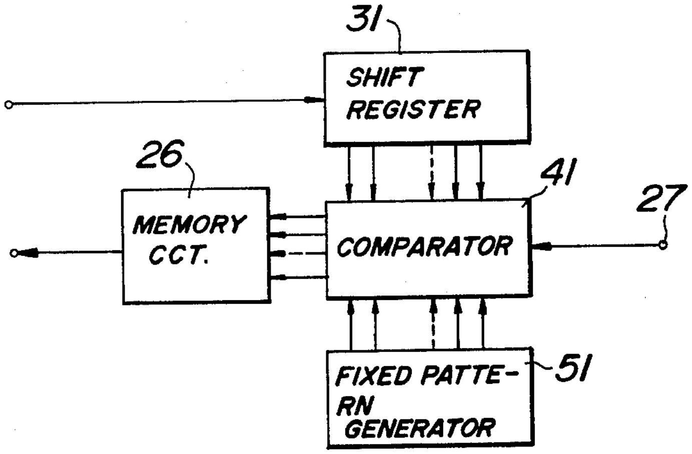

In the synchronizing signal reproducing apparatus just mentioned above when use is made of the coincidence circuit 6 or 7 as shown in FIG. 5, a coincidence pulse is never produced, even if only one bit of the input signal differs from the fixed pulse pattern. If S/N of the input signal is sufficiently good, there will not occur any problem, but if S/N deteriorates, a coincidence pulse might not be produced even when a true synchronizing signal is received. That is when one or more pulses of the PFP signal or the MCC signal are lacked or noise is inserted in a position which should be 0 so as to change a level of this position to 1, a coincidence pulse is not produced. Therefore in case that the number of bits of the fixed pattern increases and further noise of impulse nature is admixed in the transmission signal, it is necessary to protect the coincidence pulse. For such a purpose use may be made of a PFP coincidence circuit shown in FIG. 6. In FIG. 6 a reference numeral 31 shows a shift register which is the same as that shown in FIG. 5, 41 a comparator, 51 a fixed pulse pattern generator which is the same as that shown in FIG. 5 and 26 illustrates a memory circuit. The gated synchronizing signal is held in the shift register 31 and is compared bit by bit with the output from the fixed pulse pattern generator 51 at such a timing that the signal to be compared is just applied to the shift register 31 by means of a timing signal applied to a terminal 27. Coincidence pulses which are produced by coincidence during this bit by bit comparison are supplied to the memory circuit 26. The memory circuit stores these coincidence pulses. The memory circuit assumes that all of the coincidence pulses are supplied when the number of the stored pulses becomes greater than a predetermined number so as to produce a coincidence output. In this manner even if a portion of the PFP signal is lacked due to external noise, a stable synchronizing output can be obtained.

Figure 7:
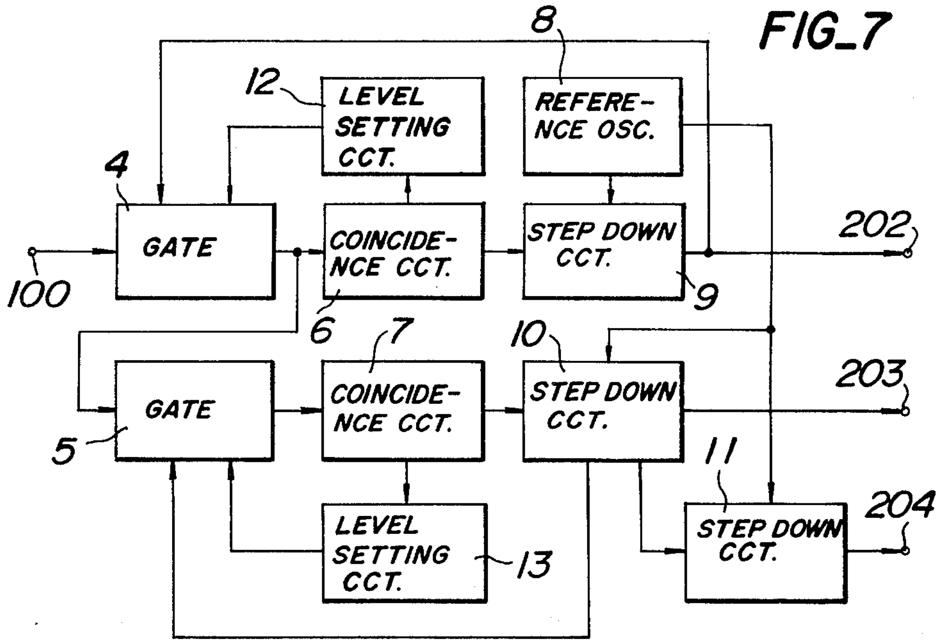
FIGS. 7 and 8 are block diagrams illustrating two embodiments of the apparatus according to the invention.

FIG. 7 is a block diagram showing another embodiment of the invention. A different point of this embodiment from that shown in FIG. 2 is that a reference oscillator 8 is provided and a frequency of a reference signal produced by the oscillator is stepped down by the step down circuits 9, 10 and 11. The reference oscillator 8 produces a stable frequency and its frequency is selected as a common multiple of the repetition frequencies of the horizontal synchronizing signal, the audio PCM frame synchronizing signal and the TV frame synchronizing signal. Step down ratios of the step down circuits 9, 10 and 11 are so selected in accordance with the frequency of the output signal from the reference oscillator 8 that three signals having the same frequencies as those of the above three synchronizing signals can be obtained by frequency division. Since the operation of the synchronizing signal reproducing apparatus of this embodiment is basically same as that of the apparatus shown in FIG. 2, an explanation thereof is omitted. The present embodiment may be applied to a case in which the frequency of the bit synchronizing signal is not an integer ratio with respect to the frequency of the horizontal synchronizing signal or the audio PCM frame synchronizing signal.

Figure 8:
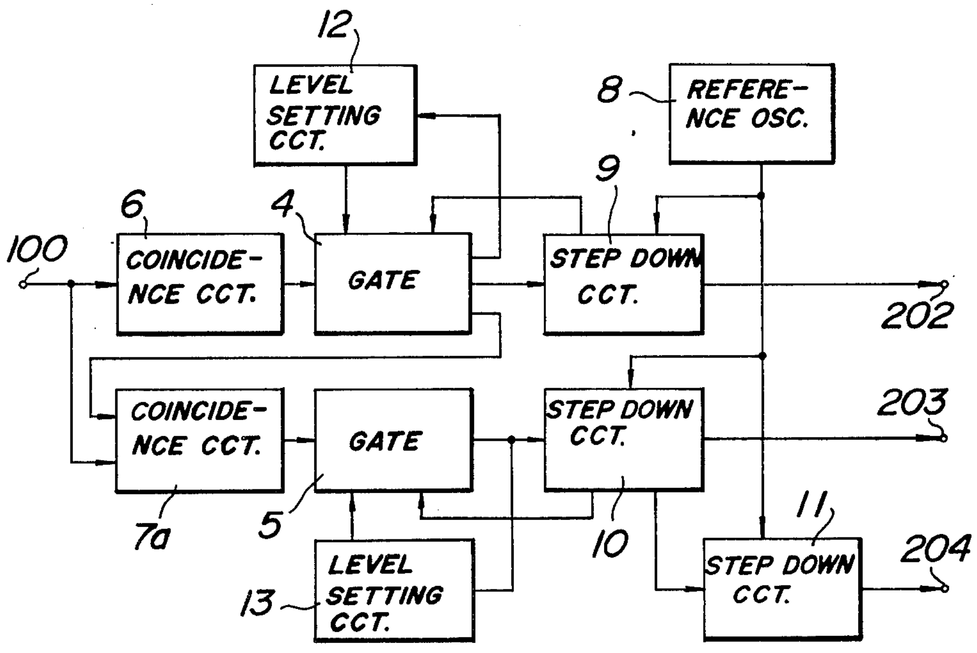

FIG. 8 is a block diagram illustrating another embodiment of the invention. In this embodiment the gate circuits 4 and 5 and the coincidence circuits 6 and 7 of the embodiment shown in FIG. 7 are exchanged by each other so as to slightly modify the signal path. A reference numeral 7*a* is a coincidence circuit which is substantially same as the coincidence circuit 7, but to the coincidence circuit 7*a* are supplied the composite signal and a coincidence pulse of the horizontal synchronizing signal or the audio PCM frame synchronizing signal passing through the gate circuit 4. The coincidence circuit 7*a* forms a coincidence pulse at a position in which the TV frame synchronizing signal of the input composite signal is inserted and produces an output coincidence pulse which is a logic product of the above coincidence pulse and a coincidence pulse supplied through the gate circuit 4 from the coincidence circuit 6. As described above since the TV frame synchronizing signal is inserted in a position coincided with the horizontal synchronizing signal or the audio PCM frame synchronizing signal, the coincidence circuit 7*a* scarcely produces an erroneous coincidence pulse. It should be noted that such a construction may also be applied to the embodiment shown in FIG. 2.

In the embodiments shown in FIGS. 2 and 7, to the coincidence circuit 6 or 7 is applied the signal passing through the gate circuit 4 or 5. Therefore a pulse width of the gate pulse should include all the bit signals constituting the fixed pulse pattern to be compared in the coincidence circuit 6 or 7. On the other hand in the embodiment shown in FIG. 8. since the input signal is firstly supplied to the circuit 6 or 7*a* only the coincidence pulse passes through the gate circuit 4 or 5. Therefore the pulse width of the gate pulse may be made sufficiently narrow which can pass only a single bit pulse. As the results, there is an advantage that an erroneous signal scarecely passes through the gate circuit 4 or 5.

In the embodiment explained above the synchronization is first established for the signal having the repetition frequency which is equal to that of the horizontal synchronizing signal $f_H$ and then the synchronization for the frequencies $f_V$ and $f_A$ of the TV frame synchronizing signal and the audio PCM frame synchronizing signal are established. It is matter of course that the synchronization for the frequency $f_A$ of the audio PCM frame synchronizing signal may be first established and then the synchronization for the frequencies $f_V$ and $f_H$ may be established.

As explained above in detil according to the invention even when various synchronizing signals having different repetition frequencies are transmitted in a time division mode, it is possible to reproduce synchronizing signals each of which is synchronized with each of the synchronizing signals.

We claim:

1. A synchronizing signal reproducing apparatus which receives a composite signal including video and audio signals transmitted in accordance with a predetermined sequence, a first synchronizing signal inserted in said video signal for reproducing it, a second synchronizing signal inserted in said audio signal for reproducing it and having a repetition frequency different from that of said first synchronizing signal, at a common division frequency of said first and second synchronizing signals their phase being coincided with each other, and a third synchronizing signal inserted in at least boundaries between said video and audio signals and having a repetition frequency of $1/n$ ($n$ is an integer) of said common division frequency of said first and second synchronizing signals and a phase coincided with those of said first and second synchronizing signals, and reproduces all of said first, second and third synchronizing signals comprises

- means for detecting either one of said first and second synchronizing signals and for reproducing a signal synchronized with the detected synchronizing signal,
- means for detecting said third synchronizing signal and for reproducing a signal synchronized with the detected third synchronizing signal, and
- means for reproducing a signal synchronized with the other of said first and second synchronizing signals by means of said reproduced third synchronizing signal.

2. A synchronizing signal reproducing apparatus which receives a composite signal including video and audio signals transmitted in accordance with a predetermined sequence, a first synchronizing signal inserted in said video signal for reproducing it, a second synchronizing signal inserted in said audio signal for reproducing it and having a repetition frequency different from that of said first synchronizing signal, at a common division frequency of said first and second synchronizing signals their phase being coincided with each other, and a third synchronizing signal inserted in at least boundaries between said video and audio signals and having a repetition frequency of $1/n$ ( n is an integer) of said common division frequency of said first and second synchronizing signals and a phase coincided with those of said first and second synchronizing signals, and reproduces all of said first, second and third synchronizing signals comprises

- a reference oscillator for generating a signal having a repetition frequency which is a common multiple of the repetition frequencies of said three synchronizing signals,
- first, second and third step down circuits for stepping down the output signal from said reference oscillator to form three signals each of which has the same repetition frequency as that of each of said three synchronizing signals,
- a first detection means for detecting a predetermined one of said first and second synchronizing signals from said composite signal,
- means for synchronizing the output signal from said first step down circuit which produces the signal of the same repetition frequency as that of said predetermined synchronizing signals with said detected synchronizing signal by means of the output signal from said first detecting means,
- a second detection means for detecting said third synchronizing signal from said composite signal,
- means for synchronizing the output signal from said third step down circuit which generates the signal of the same repetition frequency as that of said third synchronizing signal with said third synchronizing signal by means of the output signal from said second detection means, and means for synchronizing the output signal from said second step down circuit which generates the signal of the same repetition frequency as that of the other of said first and second synchronizing signals with the other of said first and second synchronizing signals by means of the output signal from said third step down circuit.

3. A synchronizing signal reproducing apparatus which receives a composite signal including a video signal and a pulse code modulated audio multiplexed signal transmitted in accordance with a given sequence, a first synchronizing signal inserted in said video signal for reproducing it and coded by pulses synchronized with a modulated pulse series of said audio multiplexed signal, a second synchronizing signal inserted in said audio multiplexed signal for reproducing it, a repetition frequency of which is different from that of said first synchronizing signal, but a phase of which coincides with that of the first synchronizing signal at a common division of said repetition frequencies of said first and second synchronizing signals, said second synchronizing signal being coded by pulses synchronized with said modulated pulse series of said audio multiplexed signal, and a pulse coded third synchronizing signal inserted at least in boundaries of said video signal and said audio multiplexed signal and having a repetition frequency of $1/n$ ($n$ is an integer) of said common division frequency at which said first and second synchronizing signals are synchronized with each other, a phase of said third synchronizing signal being synchronized with said first and second synchronizing signals and reproduces all of said first, second third synchronizing signals comprises a reference oscillator for generating a signal having a frequency which is a common division of said three synchronizing signals, first, second and third step down ciricuits for stepping down the output signal from said oscillator to form three signals each of which has a frequency equal to each of the repetition frequencies of said three synchronizing signals, a first detection means for detecting a predetermined one of said first and second synchronizing signals from said composite signal, means for synchronizing the output signal from said first step down circuit which produces the signal of the frequency equal to that of the predetermined one of said first and second synchronizing signals with said detected one of said first and second synchronizing signals by means of the output signal from said first detection means, a second detection means for detecting said third synchronizing signal from said composite signal, and means for synchronizing the output from said second step down circuit which produces the signal having the repetition frequency equal to that of the other of said first and second synchronizing signals with said other synchronizing signal by means of the output from said third step down circuit.

4. A synchronizing signal reproducing apparatus which receives a composite signal including a video signal and a pulse code modulated audio multiplexed signal transmitted in accordance with a given sequence, a first synchronizing signal inserted in said video signal for reproducing it and coded by pulses synchronized with a modulated pulse series of said audio multiplexed signal, a second synchronizing signal inserted in said audio multiplexed signal for reproducing it, a repetition frequency of which is different from that of said first synchronizing signal, but a phase of which coincides with that of the first synchronizing signal at a common division of said repetition frequencies of said first and second synchronizing signals, said second synchronizing signal being coded by pulses synchronized with said modulated pulse series of said audio multiplexed signal, and a pulse coded third synchronizing signal inserted at least in boundaries of said video signal and said audio multiplexed signal and having a repetition frequency of $1/n$ ($n$ is an integer) of said common division frequency at which said first and second synchronizing signals are synchronized with each other, a phase of said third synchronizing signal being synchronized with said first and second synchronizing signals and reproduces all of said first, second and third synchronizing signals comprises a reference oscillator for generating a signal having a repetition frequency which is equal to a common division of said three synchronizing signals, a first gate circuit, a first coincidence circuit for receiving said composite signal through said first gate circuit and producing a first coincidence pulse when there is supplied the same pulse series as that constituting a predetermined one of said first and second pulse coded synchronizing signals, a first step down circuit for stepping down the output signal from said reference oscillator to form a signal having the same repetition frequency as that of said predetermined synchronizing signal, means for synchronizing the output signal from said first step down circuit with said predetermined synchronizing signal by means of said first coincidence signal generated by said first coincidence circuit, means for supplying the output signal from said first step down circuit to said first gate circuit and gating the signal supplied to said first gate circuit at a timing of the output signal from said first step down circuit, a first coincidence confirmation circuit for generating a first coincidence confirmation signal having a voltage level higher than a predetermined level as long as said first coincidence signal generated by said first coincidence circuit occurs at a time interval shorter than a predetermined time interval and controlling said first gate circuit in such a manner that if the voltage of said first coincidence confirmation signal is higher than said predetermined level, said first gate circuit is made conductive only when the output signal from said first coincidence circuit is supplied and if the voltage of said first coincidence confirmation signal is lower than said predetermined level, said first gate circuit is made conductive so as to pass all signals, a second gate circuit, a second coincidence circuit for receiving said composite signal applied through said first and second gate circuits and generating a second coincidence signal when the same pulse code as that of said third synchronizing signal is supplied, a second step down circuit for stepping down the output signal from said reference oscillator to generate a signal having the same repetition frequency as that of said third synchronizing signal, means for synchronizing the output signal from said second step down circuit with said third synchronizing signal by means of said second coincidence signal generated by said second coincidence circuit, means for supplying the output signal from said second step down circuit to said second gate circuit and gating the signal passing through said second gate circuit at a timing of the output signal from said second step down circuit, a second coincidence confirmation circuit for generating a second coincidence confirmation signal having a voltage level higher than a predetermined level as long as said second coincidence signal generated by said second coincidence circuit occurs at a time interval shorter than a predetermined time interval and controlling said second gate circuit in such a manner that if the voltage level of said second coincidence confirmation signal is higher than said predetermined level, said second gate circuit is made conductive only when the output signal from said second step down circuit is supplied and if the voltage of said second coincidence confirmation signal is lower than said predetermined level, said second gate circuit is made conductive so as to pass all signals, a third step down circuit for stepping down the output signal from said reference oscillator to generate a signal having the same repetition frequency as that of said other of said first and second synchronizing signals, and means for synchronizing the output signal from said third step down circuit with said other synchronizing signal by means of said output signal from said second step down circuit.

5. A synchronizing signal reproducing apparatus which receives a composite signal including a video signal and a pulse code modulated audio multiplexed signal transmitted in accordance with a given sequence, a first sychronizing signal inserted in said video signal for reproducing it and coded by pulse synchronized with a modulated pulse series of said audio multiplexed signal, a second synchronizing signal inserted in said audio multiplexed signal for reproducing it, a repetition frequency of which is different from that of said first synchronizing signal, but a phase of which coincides with that of the first synchronizing signal at a common division of said repetition frequencies of said first and second synchronizing signals, said second synchronizing signal being coded by pulses synchronized with said modulated pulse series of said audio multiplexed signal, and a pulse coded third synchronizing signal inserted at least in boundaries of said video signal and said audio multiplexed signal and having a repetition frequency of $1/n$ ($n$ is an integer) of said common division frequency at which said first and second synchronizing signals are synchronized with each other, a phase of said third synchronizing signal being synchronized with said first and second synchronizing signals and reproduces all of said first, second and third synchronizing signals comprises a reference oscillator for generating a signal having a repetition frequency equal to a common multiple of said three synchronizing signals, a first coincidence circuit for receiving said composite signal and producing a first coincidence signal when the same pulse series as that constituting a predetermined one of said pulse coded first and second synchronizing signals is supplied, a first step down circuit for stepping down the output signal from said reference oscillator to form a signal having the same repetition frequency as that of said predetermined synchronizing signal, a first gate circuit for gating said composite signal by means of the output signal from said first step down circuit, means for supplying said first coincidence signal generated by said first coincidence circuit through said first gate circuit to said first step down circuit and synchronizing the output signal from said first step down circuit with said predetermined synchronizing signal, a first coincidence confirmation circuit for producing a first coincidence confirmation signal having a voltage level which is higher than a predetermined level as long as said first coincidence signal passing through said first gate circuit occurs at a time interval shorter than a predetermined time interval and controlling said first gate circuit in such a manner that if the voltage of said first coincidence confirmation signal is higher than said predetermined level, said first gate circuit is made conductive only when the output signal from said first step down circuit is supplied and if the voltage of said first coincidence confirmation signal is lower than said predetermined level, said gate circuit is made conductive so as to pass all signals, a second coincidence circuit for receiving said composite signal, generating a coincidence pulse when the same pulse series as that constituting said pulse coded third synchronizing signal and producing a second coincidence signal which is a logic product of said coincidence pulse and said first coincidence signal passed through said first gate circuit, a second step down circuit for stepping down the output from said reference oscillator to generate a signal having the same repetition frequency as that of said third repetition frequency, a second gate circuit for gating the input signal by means of the output signal from said second step down circuit, means for supplying said second coincidence signal generated by said second coincidence circuit to said second step down circuit through said second gate circuit and synchronizing the output of said second step down circuit with said third synchronizing signal, a second coincidence confirmation circuit for producing a second coincidence confirmation signal having a voltage level which is higher than a predetermined level as long as said second coincidence signal passing through said second gate circuit occurs at a time interval shorter than a predetermined time interval and controlling said second gate circuit in such a manner that if the voltage of said second coincidence confirmation signal is higher than said predetermined level, said second gate circuit is made conductive only when the output signal from said second step down circuit is supplied and if the voltage of said second coincidence confirmation signal is lower than said predetermined level, said second gate circuit is made conductive so as to pass all signals, a third step down circuit for stepping down the output signal from said reference oscillator to generate a signal having the same repetition frequency as that of the other of said first and second synchronizing signals, and means for synchronizing the output signal from said third step down circuit with said other synchronizing signal by means of the output signal from said second step down circuit.

6. A synchronizing signal reproducing apparatus as claimed in claim 3, said reference oscillator comprises means for extracting a pulse series synchronized with said modulated pulse series of said audio multiplexed signal from said composite signal, an oscillator for generating a signal having the same repetition frequency as the bit repetition frequency of said pulse series, and a phase detector for phase-detecting the output signal from said oscillator and said extracted pulse series and synchronizing the output signal from said oscillator with said pulse series by feeding back the detected output to said oscillator.

7. A synchronizing signal reproducing apparatus as claimed in claim 4, said reference oscillator comprises means for extracting a pulse series synchronized with said modulated pulse series of said audio multiplexed signal from said composite signal, an oscillator for generating a signal having the same repetition frequency as the bit repetition frequency of said pulse series, and a phase detector for phase-detecting the output signal from said oscillator and said extracted pulse series and synchronizing the output signal from said oscillator with said pulse series by feeding back the detected output to said oscillator.

8. A synchronizing signal reproducing apparatus as claimed in claim 5, said reference oscillator comprises means for extracting a pulse series synchronized with said modulated pulse series of said audio multiplexed signal from said composite signal, an oscillator for generating a signal having the same repetition frequency as the bit repetition frequency of said pulse series, and a phase detector for phase-detecting the output signal from said oscillator and said extracted pulse series and synchronizing the output signal from said oscillator with said pulse series by feeding back the detected output to said oscillator.

* * * * *